(12) United States Patent
Thoman et al.

(10) Patent No.: US 6,239,412 B1
(45) Date of Patent: May 29, 2001

(54) SIDE WALL FUSION HEATER

(75) Inventors: Timothy M. Thoman; James R. Perrault, both of Tulsa, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 0 days.

(21) Appl. No.: 09/225,603

(22) Filed: Jan. 5, 1999

(51) Int. Cl.[7] .................................................. H05B 1/00
(52) U.S. Cl. ............................................ 219/243; 156/499
(58) Field of Search .............................. 219/243, 225, 219/227, 534, 535, 633, 643, 544, 540, 530; 156/499, 293, 257, 304.2; 138/33

(56) References Cited

U.S. PATENT DOCUMENTS

| | | | |
|---|---|---|---|
| 3,231,716 | * 1/1966 | Van Den Bosch | 219/433 |
| 3,616,024 | * 10/1971 | Windle | 156/257 |
| 3,729,360 | 4/1973 | McElroy | 156/499 |
| 3,846,208 | * 11/1974 | McElroy | 156/499 |
| 3,966,528 | * 6/1976 | Christie | 156/293 |
| 3,968,348 | * 7/1976 | Stanfield | 219/535 |
| 4,281,238 | * 7/1981 | Noma et al. | 219/535 |
| 4,352,708 | 10/1982 | McElroy | 156/378 |
| 4,369,356 | * 1/1983 | Tsurutani et al. | 219/535 |
| 5,286,952 | * 2/1994 | McMills | 219/535 |
| 5,403,993 | 4/1995 | Cordia | 219/549 |
| 5,407,514 | 4/1995 | Butts | 156/274.2 |
| 5,407,520 | 4/1995 | Butts | 156/379.7 |
| 5,466,916 | 11/1995 | Iguchi | 219/633 |
| 5,526,561 | 6/1996 | McGaffigan | 29/605 |
| 5,814,182 | 9/1998 | McElroy | 156/358 |
| 5,820,720 | * 10/1998 | Campbell | 156/535 |
| 5,916,468 | * 6/1999 | Akiyama et al. | 219/535 |
| 5,966,501 | * 10/1999 | Miller et al. | 392/458 |

* cited by examiner

Primary Examiner—Philip H. Leung
Assistant Examiner—Quang Van
(74) Attorney, Agent, or Firm—Frank J. Catalano

(57) ABSTRACT

A heater for use in fusing the end of a branch polyolefin pipe to the side wall of a main polyolefin pipe of specified radius has a first plate with a convex outer surface definable as a surface generated by rotating a first straight line about a first parallel line of origin at a radius equal to the specified radius of the main pipe and a concave inner surface, a second plate with a concave outer surface definable as a surface generated by rotating a second straight line about a second parallel line of origin at a radius equal to the specified radius of the main pipe and a convex inner surface and a heating element of substantially constant thickness disposed in laminar relationship between the first and second plates, the inner surfaces of the plates being contoured so that, with the heating element in laminar relationship therebetween, the lines of origin of the outer surfaces of the plates lie a common plane. A linkage pivotally connected at one end to the fixed base of the machine and pivotally connected at another end to the moving carriage of the machine is cooperable with heater to disengage the heater from the molten branch or main pipe from which the heater does not first disengage as the molten branch pipe is moved away from the molten main pipe.

23 Claims, 8 Drawing Sheets

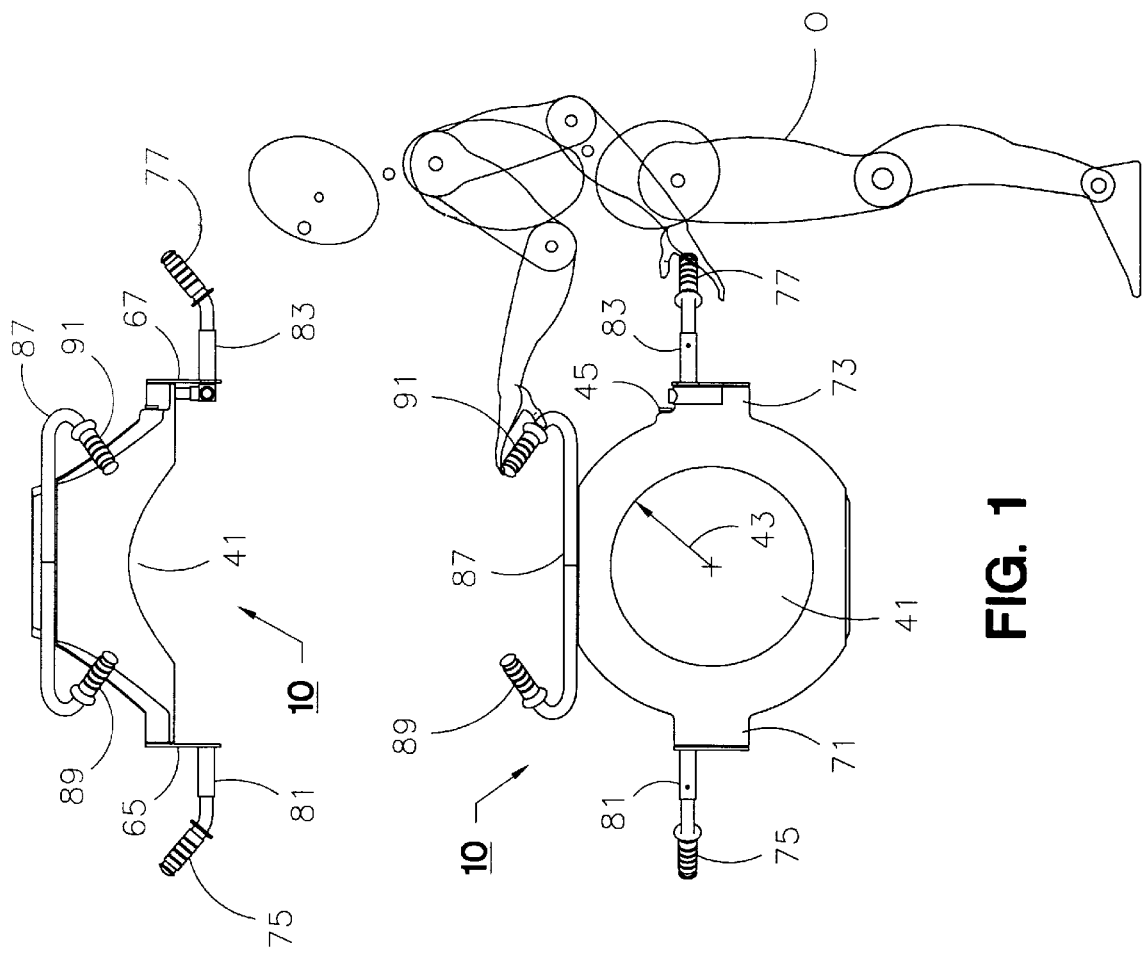
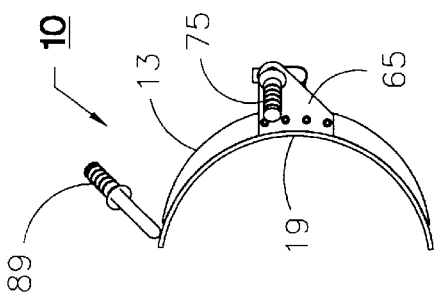
FIG. 1
FIG. 2
FIG. 3

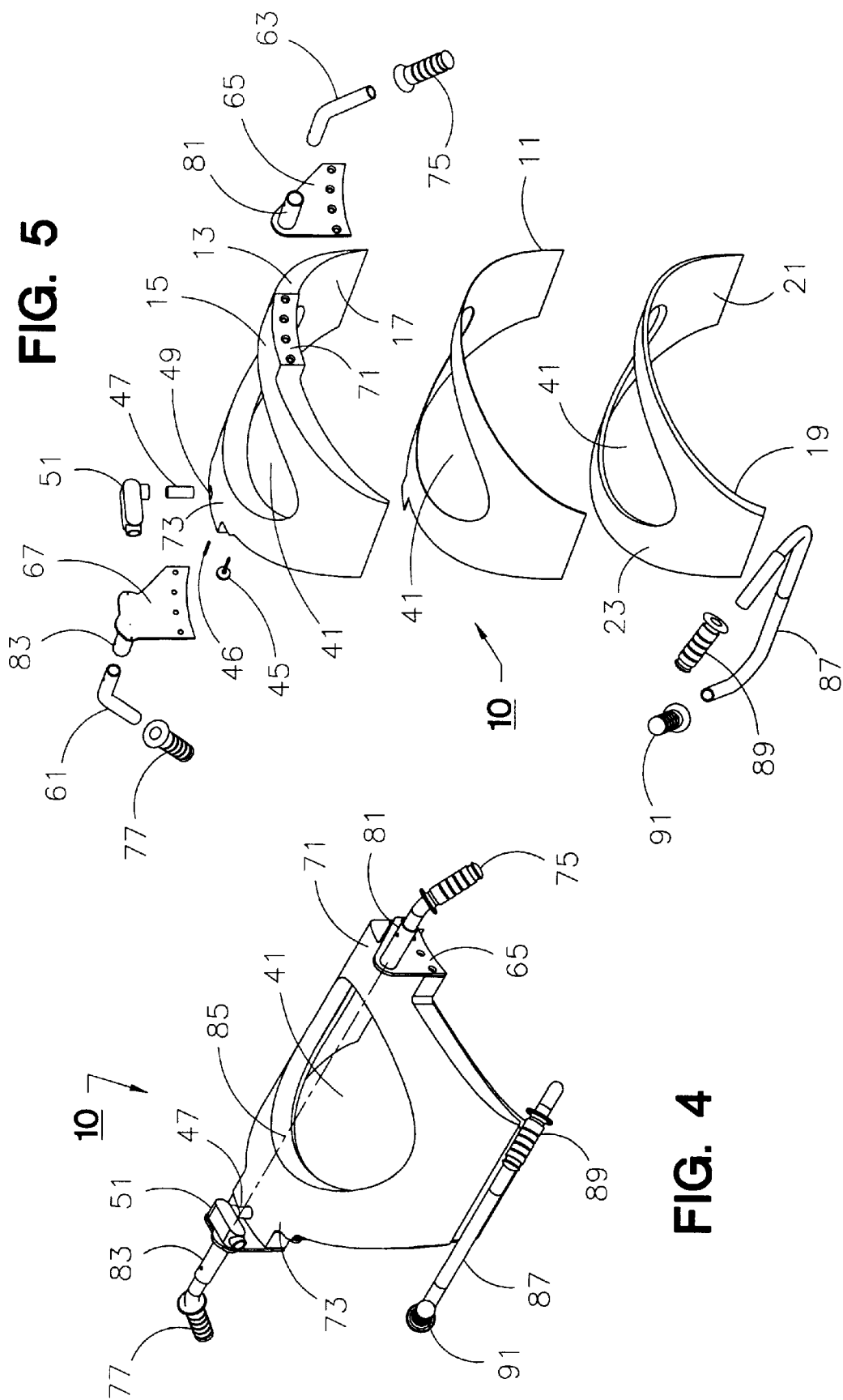

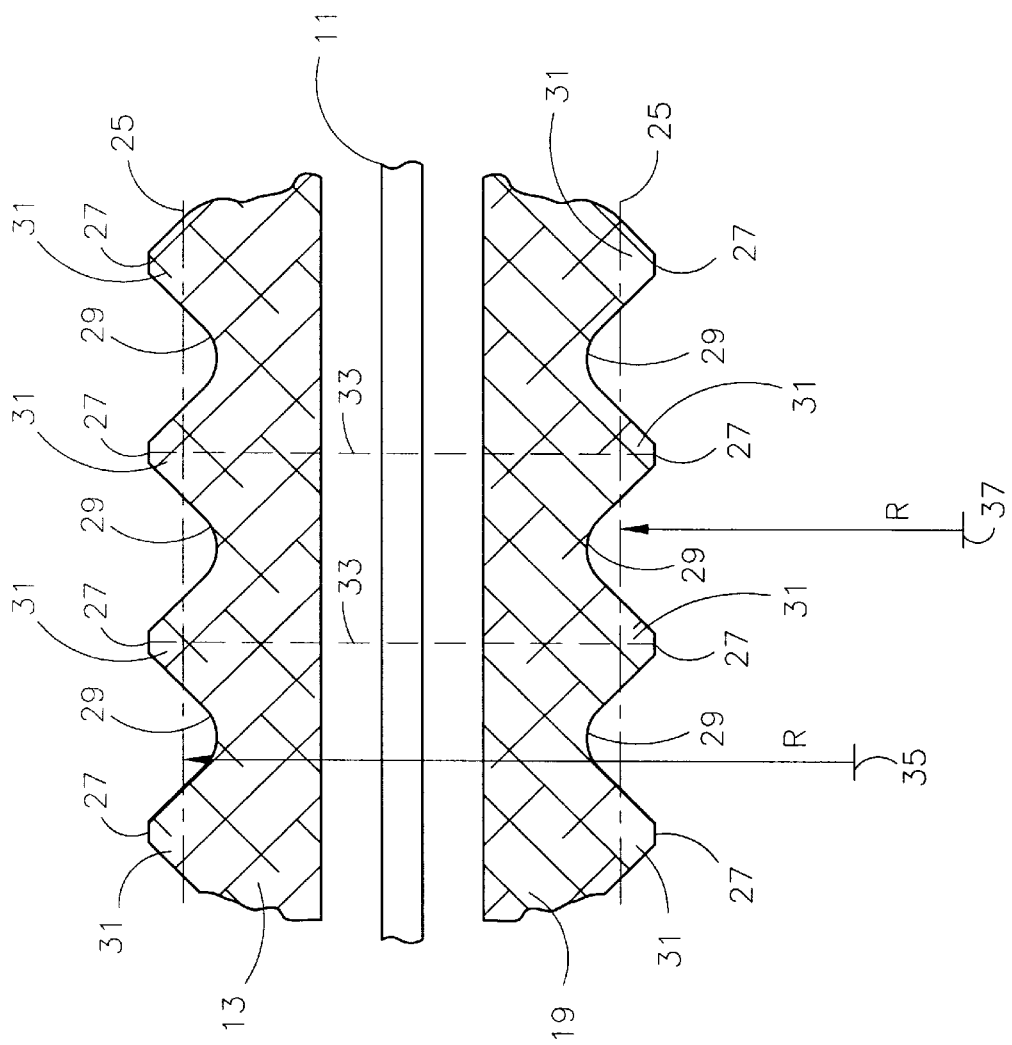

SIDE WALL FUSION HEATER

BACKGROUND OF THE INVENTION

This invention relates generally to portable machines for fusing polyolefin pipe and more particularly concerns heaters used to bring the pipe surfaces to be joined to a molten state prior to fusion.

The end-to-end welding of polyolefin pipes is the subject of earlier U.S. Pat. No. 3,729,360 issued on Apr. 24, 1973 for a Portable Thermoplastic Pipe Fusion Apparatus, U.S. Pat. No. 4,352,708 issued on Oct. 5, 1982 for a Defined Force Fusion Machine for Joining Plastic Pipe and U.S. Pat. No. 5,814,182 issued Sep. 29, 1998 for a Self-Contained and Self-Propelled Machine for Heat Fusing Polyolefin Pipes. In all of these machines, the pipe surfaces to be joined are brought to a molten state using a heater which is substantially planar in nature. That is, since the pipes are being joined end-to-end at planar faces, the heater inserted between them to simultaneously bring the faces to a molten state is a relatively thin planar structure. The heater is, therefore, relatively lightweight and easy to handle and consequently is suitable for use in field operations.

In the aforementioned U.S. Pat. No. 4,352,708, fusion of a branch pipe saddle fitting to the side wall of a main pipe is also taught. Branch pipe is then fused to the saddle fitting. However, while the machine therein disclosed can be used for sidewall fusion, the heater required to bring the surfaces to be joined on larger diameter pipes to a molten state is comparatively large and unwieldy for use in the field. Since the surfaces to be joined are curved, the heater must have opposed faces with complementary curves. Since these curved surfaces are disposed on opposite sides of a planar thermal element, the heater is much thicker and, in the case of larger diameter pipes, also comparatively larger diameter, so as to require the use of a crane or other lifting device to manipulate the heater. Therefore, sidewall fusion on pipes greater than 8" in diameter cannot be practically accomplished in the field using known heaters. The present practice for larger diameter pipes is to make a T-configuration in the plant using a lifting device such as a crane to manipulate the heater, to ship the T-configuration to the site, to cut the main pipeline and remove a section of the pipe and then to weld the T-configuration to the main pipeline using existing end-to-end fusion technology. Furthermore, the undesirable thickness of the heater results in longer heat-up times for the heater, perhaps as much as half an hour, and poor temperature distribution over the heater surface which in turn causes an undesirable uneven melt in the pipe surface.

It is, therefore, a primary object of this invention to provide a heater usable in the field to bring surfaces of larger diameter pipe to molten condition for sidewall fusion. It is also an object of this invention to provide a heater usable in the sidewall fusion of polyolefin pipes which is lightweight and easy to handle. A further object of this invention is to provide a heater usable in the sidewall fusion of polyolefin pipes which is a relatively thin laminar assembly of a heating element sandwiched between relatively thin surface-contacting plates. Another object of this invention is to provide a heater usable in the sidewall fusion of polyolefin pipes which is adapted to be easily separated from the molten surfaces of the main and branch pipes. It is also an object of this invention to provide a heater usable in the sidewall fusion of polyolefin pipes which is easily removed from its operating position between the molten surfaces of the main and branch pipes. A further object of this invention is to provide a heater usable in the sidewall fusion of polyolefin pipes which has a relatively short heat-up time, perhaps in the order of 12 minutes. Another object of this invention is to provide a heater usable in the sidewall fusion of polyolefin pipes which provides relatively even temperature distribution on the heater contact surfaces.

SUMMARY OF THE INVENTION

In accordance with the invention a heater for use in fusing the end of a branch polyolefin pipe to the side wall of a main polyolefin pipe of specified radius has a first plate with a convex outer surface definable as a surface generated by rotating a first straight line about a first parallel line of origin at a radius equal to the specified radius of the main pipe and a concave inner surface, a second plate with a concave outer surface definable as a surface generated by rotating a second straight line about a second parallel line of origin at a radius equal to the specified radius of the main pipe and a convex inner surface and a heating element of substantially constant thickness disposed in laminar relationship between the first and second plates, the inner surfaces of the plates being contoured so that, with the heating element in laminar relationship therebetween, the lines of origin of the outer surfaces of the plates lie a common plane. Preferably one of the plates, and most preferably the second plate with the concave outer surface, has a constant thickness. The plates can be welded or screwed together with the heating element therebetween. Preferably the outer surfaces of the plates are serrated and their radii extend from their lines of origin to their respective meridians between the zeniths and nadirs of their serrations with their zeniths and nadirs aligned on cross-sections transverse to their lines of origin, zenith-to-zenith and nadir-to-nadir. Preferably, the laminar arrangement has a weight reducing aperture therethrough defined by a circular cylinder of radius less than an inner radius of the branch pipe, the cylinder being centered on the common plane of and extending perpendicular to the lines of origin. A thermometer is provided for indicating the temperature of the heater and a temperature sensor such as a resistance temperature device is used to provide a control signal from the heater. A junction box is provided for connecting the temperature sensor to the machine control circuit and the heating element to an electrical power source.

Preferably the machine has a base for clamping the main pipe in alignment with the branch pipe and a carriage assembly for guiding motion of the branch pipe toward and away from the main pipe and the laminar arrangement is adapted to be cooperable with the carriage assembly for horizontally aligning the laminar arrangement with a saddle-cut end of the branch pipe. Most preferably, the carriage assembly has a pair of horizontal rods diametrically aligned outside of the branch pipe and a pair of rods fixed to and extending outwardly from the laminar arrangement along an axis parallel to the lines of origin and above the common plane for aligning the laminar arrangement with the branch pipe.

It is further preferred that the machine include a linkage pivotally connected at one end to the base of the machine and pivotally connected at another end to the carriage of the machine, the linkage being cooperable with one of the heater assembly aligning rods to disengage the laminar arrangement from the molten branch or main pipe from which the laminar arrangement does not first disengage as the molten branch pipe is moved away from the molten main pipe. In a preferred embodiment, the linkage has a branch link pivotally connected to the carriage of the machine, a main link of length substantially equal to the length of the branch link and pivotally connected to the vertical post of the machine and a drag link shorter than the branch and main links and pivotally connected therebetween The linkage is disposed in a cup-configuration around one of heater assembly rods when the laminar arrangement is abutted between the main and branch pipes. Either the branch or main link strikes the heater assembly rod after the branch or main pipe, respectively, is disengaged from the laminar arrangement as the molten branch pipe is moved away from the molten main pipe. Thereupon, the other of the branch and main links and the drag link rotate into alignment with each other and urge the striking branch or main links to pivot against the heater assembly rod to pry laminar arrangement from the other of the molten branch and main pipes. A pair of such linkages, preferably identical with one on either side of the laminar arrangement, is most effective.

BRIEF DESCRIPTION OF THE DRAWINGS

Other objects and advantages of the invention will become apparent upon reading the following detailed description and upon reference to the drawings in which:

FIG. 1 is a front elevation view of a preferred embodiment of the sidewall fusion heater illustrating the manual handling of the heater by a single operator;

FIG. 2 is a top plan view of the heater of FIG. 1;

FIG. 3 is a side elevation view of the heater of FIG. 1;

FIG. 4 is an isometric view of the heater of FIG. 1;

FIG. 5 is an isometric assembly view of the heater of FIG. 1;

FIG. 11 is an exploded partial horizontal cross-section of the heater of FIG. 1 with parts broken away.

Figure 6:
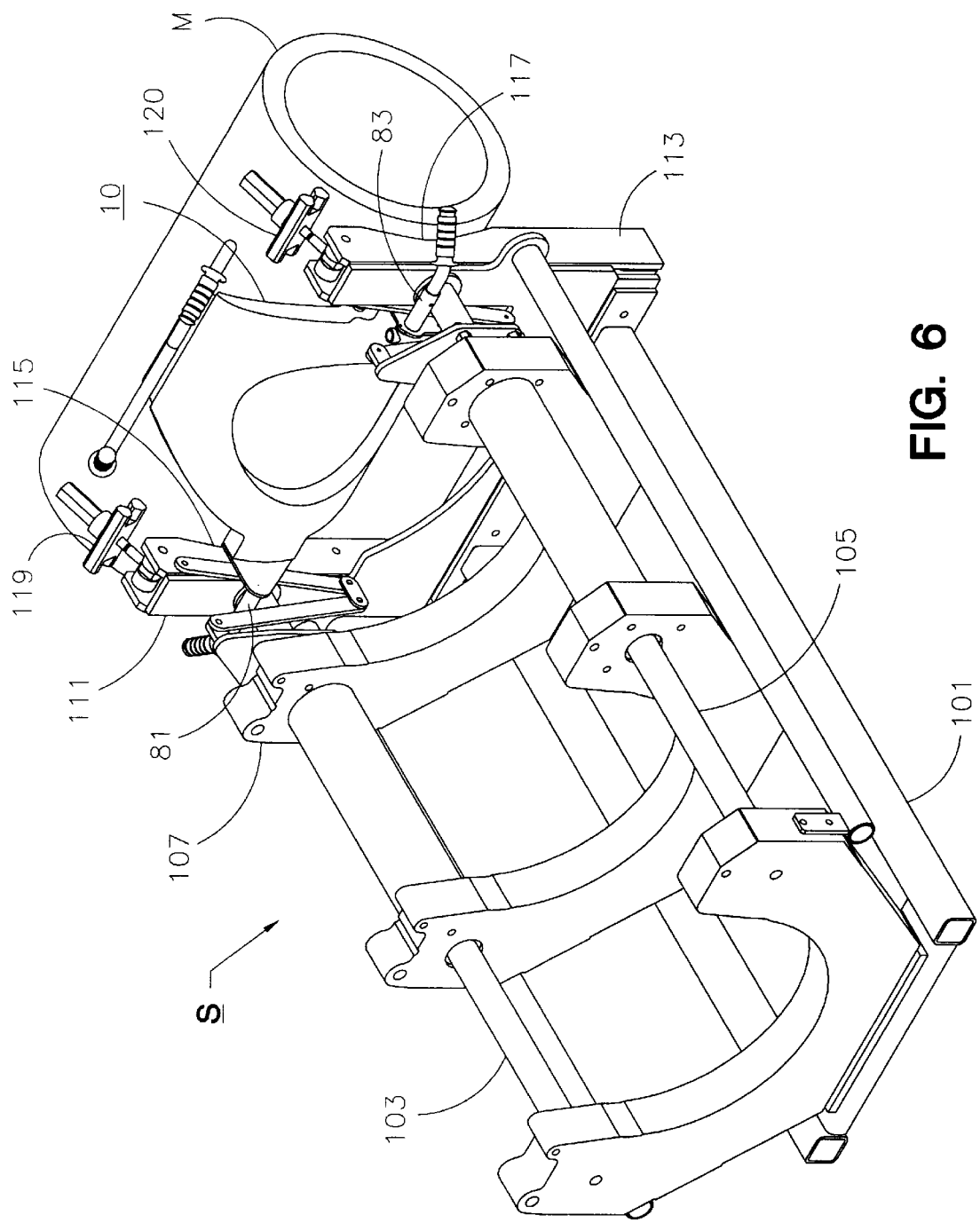
FIG. 6 is an isometric view of the heater of FIG. 1 mounted on a side wall fusion machine with a main pipe abutted against the machine mounting posts.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning first to FIGS. 1 through 5, a preferred embodiment of a heater 10 for use in sidewall fusion of polyolefin pipes is illustrated. If the operator O intends to fuse a branch pipe B to the sidewall of a main pipe M, the main pipe M typically having a relatively large outside radius in the order of greater than 4", a heater 10 will be selected based on the outside radius of the main pipe M. The main and branch pipes M and B are shown in FIGS. 7 through 10.

The heater 10 consists of a laminar arrangement of a thin heater element 11 between a first plate 13 having a convex outer surface 15 and an inner surface 17 and a second plate 19 having a concave outer surface 21 and an inner surface 23. The convex outer surface 15 of the first plate 13 and the concave outer surface 21 of the second plate 19 have radii of curvature equal to the outside radius of the main pipe M. The heater element 11 is preferably a mica/foil element of constant thickness, typically an etched foil circuit sandwiched between two sheets of dielectric mica, though other types of element having variable thickness can be used. As shown, and preferably, the second plate 19 having a concave outer surface 21 is of constant thickness and the heater element 11 is of constant thickness. Therefore, the first plate 13 having a convex outer surface 15 is of variable thickness, the inner surface 17 of this plate 13 having a radius of curvature equal to the radius of curvature of the main pipe M plus the thicknesses of the second plate 19 and the heater element 11. Conversely, the first plate 13 and the heater element 11 can be of constant thickness, in which case the radius of curvature of the inner surface 23 of the second plate 19 would be equal to the radius of curvature of the main pipe M minus the thicknesses of the heater element 11 and the first plate 13. However, none of the components of the laminar arrangement need be of constant thickness as long as the outer surfaces 15 and 21 of the first and second plates 13 and 19 are equal to the radius of curvature of the main pipe M and the heater element 11 is sandwiched therebetween. Thus, the sole requirements of the laminar arrangement are that the first plate 13 has a convex outer surface 15 definable as a surface generated by rotating a first straight line about a first parallel line of origin at a radius equal to the radius of curvature of the main pipe M, that the second plate 19 has a concave outer surface 21 definable as a surface generated by rotating a second straight line about a second parallel line of origin at a radius equal to the radius of curvature of the main pipe M and that, with the heater element therebetween, the inner surfaces 17 and 23 of the plates 13 and 19 are contoured so that the lines of origin of the outer surfaces 15 and 21 lie a common plane. Preferably, the plates 13 and 19 are welded or screwed together with the heater element 11 therebetween. Aluminum plates with a non-stick coating have worked successfully, though other materials may be used.

Looking at FIG. 11, it is also preferred that the outer surfaces 15 and 21 of the plates 13 and 19 are serrated with the radii of curvature R of the outer surfaces 15 and 21 extending from their lines of origin 35 and 37 to respective meridians 25 between zeniths 27 and nadirs 29 of the serrations 31. The configuration and purpose of the serrations 31 is explained in detail in U.S. Pat. No. 4,227,067 issued on Oct. 7, 1980 for Heater Adapted for Making Polyethylene Pipe Connections, that adapter being used for sidewall fusion of smaller diameter pipes. As shown in FIG. 11, the zeniths 27 and nadirs 29 are aligned on cross-sections 33 which are transverse to the lines of origin 35 and 37 of the meridians 25 of the outer surfaces 15 and 21, respectively, and are also aligned zenith-to-zenith and nadir-to-nadir on the cross-sections 33.

As is best seen in FIG. 1, the laminar arrangement preferably has an aperture 41 therethrough which is preferably defined by a circular cylinder of radius 43 less than an inner radius of the branch pipe B with the cylinder being centered on the common plane of the lines of origin 35 and 37 of the outer surfaces 15 and 21 of the plates 13 and 19 and perpendicular to the lines of origin 35 and 37. However, the aperture 41 can be of any configuration within the confines of such a cylinder and is preferred to minimize the weight of the laminar arrangement and to limit unnecessary melting of the main pipe M.

Looking at FIGS. 1 and 5, it is preferred that a thermometer 45 inserted in a hole in the heater be used to indicate the heater temperature and also that a temperature sensor such as a resistance temperature device 46 be embedded in an interior groove in the laminar arrangement for sensing the temperature of the laminar arrangement and providing an output voltage for the heater control system. A conduit 47 disposed in a small aperture 49 in the outer plate 13 extends from the heater element 11 and the sensor 46 to a junction box 51 to accomodate connection of the heater element 11 to an electrical power source (not shown) and the sensor 46 to the control circuit (not shown) of the heater 10. Preferably a single high temperature cord (not shown) extends through the junction box 51 and conduit 47 and contains wires for both power and temperature sensing.

To facilitate handling of the heater 10 by the operator O, a lower set of handles 61 and 63 is mounted on a pair of brackets 65 and 67 which in turn are fastened to ears 71 and 73 which extend proximate the apex of the first plate 13. The brackets could alternatively be fastened to ears on the second plate 19, but this is not preferred because of the possibility of objectionable overmelt of the main pipe M. Preferably, the handles are fitted with grips 75 and 77. As shown, the lower set of handles 61 and 63 includes a pair of rods or tube portions 83 and 81 which extend outwardly from the laminar arrangement along an axis 85 which is parallel to the lines of origin 35 and 37 of the plate outer surfaces 15 and 21 and above their common plane. The function of these portions 81 and 83 is hereinafter described. Preferably, an upper handle 87 is also fixed to the laminar arrangement along an upper portion thereof. This handle 87 is also fitted with a pair a grips 89 and 91. The handles 61, 63 and 87 can be fastened to the laminar arrangement using screws (not shown). As can best be seen in FIG. 1, the heater 10 can be manipulated by a single operator 0 or by two operators standing on opposite sides of the heater 10.

Figure 7:
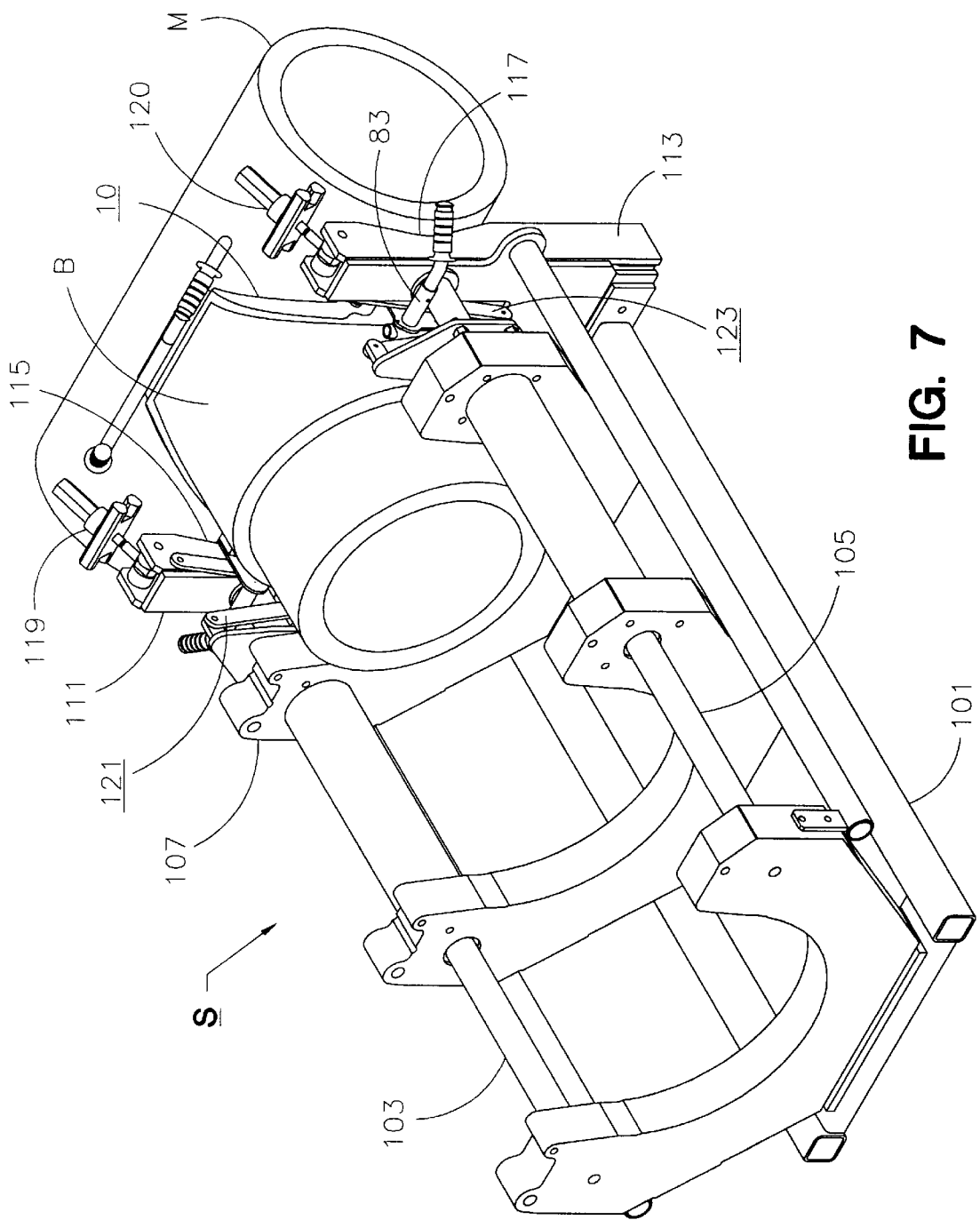
FIG. 7 is an isometric view of the heater, machine and main pipe of FIG. 6 with a branch pipe mounted on the machine carriage, all in a "fully closed" position for thermal heating of the pipe surfaces to be joined.

Turning now to FIGS. 6 and 7, the heater 10 is illustrated in conjunction with the sidewall fusion machine S with which it is used. The machine S has a base 101 on which a jaw assembly is mounted which includes horizontal rods 103 and 105. A carriage 107 reciprocates on the horizontal rods 103 and 105. Variations of the jaw assembly are structurally and operationally described in detail in U.S. Pat. Nos. 3,729,360, 4,352,708 and 5,814,182 hereinbefore mentioned. As shown in FIG. 7, the branch pipe B is diametrically aligned between the the horizontal rods 103 and 105 of the machine S and gripped in the carriage 107 so that horizontal guide rods 103 and 105 guide the branch pipe B toward and away from the main pipe M. The significant difference between the present machine S and those of the prior patents is that the machine S includes a pair of vertical posts 111 and 113 having notches 115 and 117 for aligning the main pipe M with the branch pipe B. The notches 115 and 117 automatically center the main pipe M and the main pipe is secured in place by chains (not shown) stretched tightly between pairs of keeper blocks 119 and 120 mounted on each of the posts 111 and 113. Thus pipes of various sizes can be mounted on the same machine S. Since the posts 111 and 113 are fixed to the machine frame 101 and the main pipe M is fixed to the posts, the fixed main pipe M resists the forces exerted through the branch pipe B and the heater 10 by the carriage 107 during the fusion process. As shown, the heater 10 is mounted on the horizontal rods 103 and 105 by resting the rods or tube portions 81 and 83 of the lower handles 63 and 61, respectively, thereon. The machine S is further significantly different than the machines of the prior patents in that it includes a pair of linkages 121 and 123, each pivotally connected at one end to one of the vertical posts 111 and 113 of the machine S and pivotally connected at the other end to the carriage 107 of the machine S. As is hereinafter explained, the linkages are cooperable with the rod portions 81 and 83 of the heater handles 61 and 63 for disengaging the laminar arrangement of the heater 10 from the molten surface of either the branch pipe B or the main pipe M, whichever does not first disengage from the laminar arrangement as the molten branch pipe B is moved away from the molten main pipe M. While the use of a pair of linkages 121 and 123 as shown is preferred so as to achieve a substantially even distribution of prying forces to the heater 10 and thus assure the best preparation of the surfaces for fusion, a single linkage can be used for this purpose.

Figure 8:
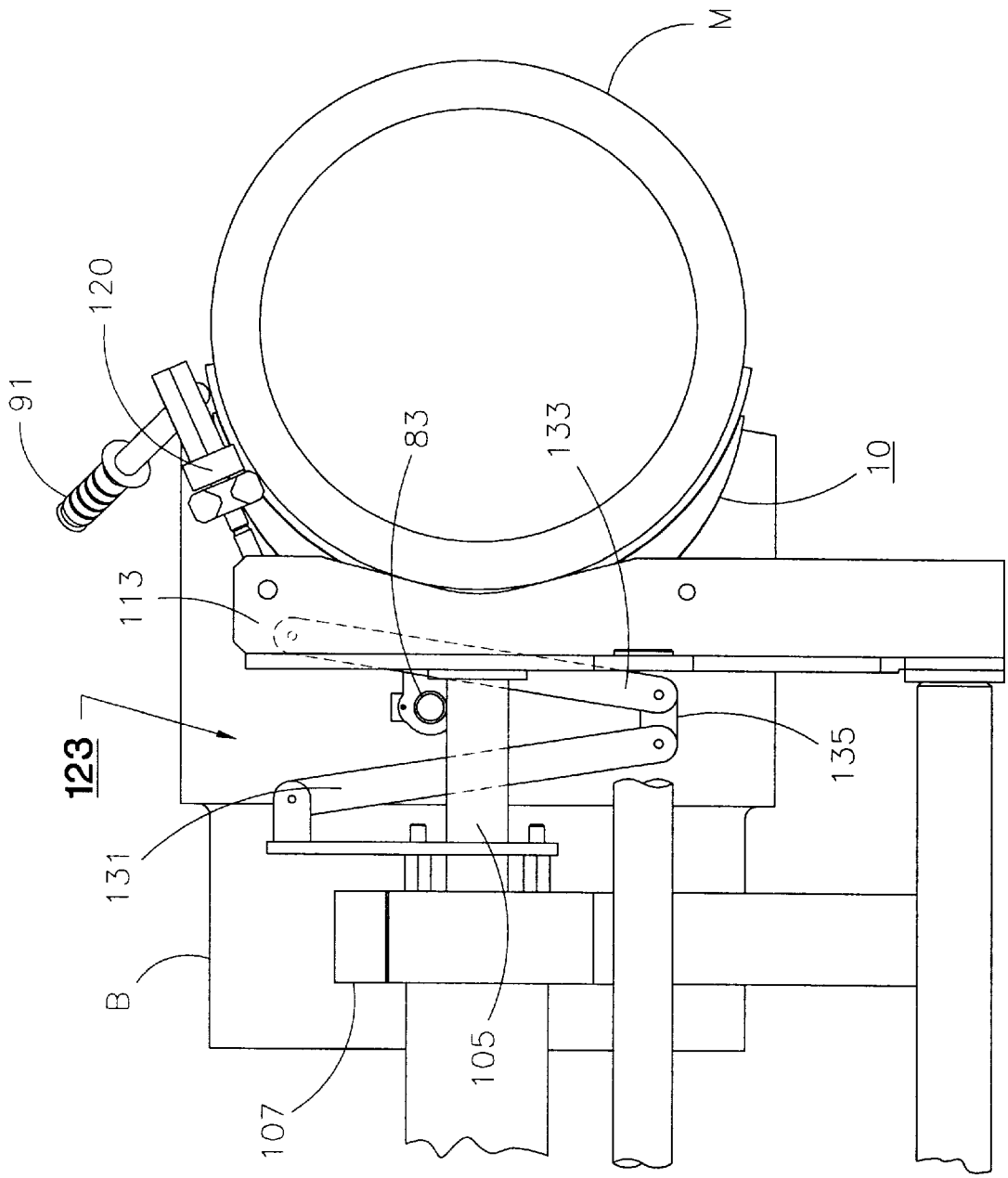
FIG. 8 is a front elevation view with parts broken away of the heater, machine, main pipe and branch pipe of FIG. 7 illustrating a preferred embodiment of the heater "pry-linkage" for separating the molten surfaces of the pipes from the heater in the "fully closed" condition.
Figure 9:
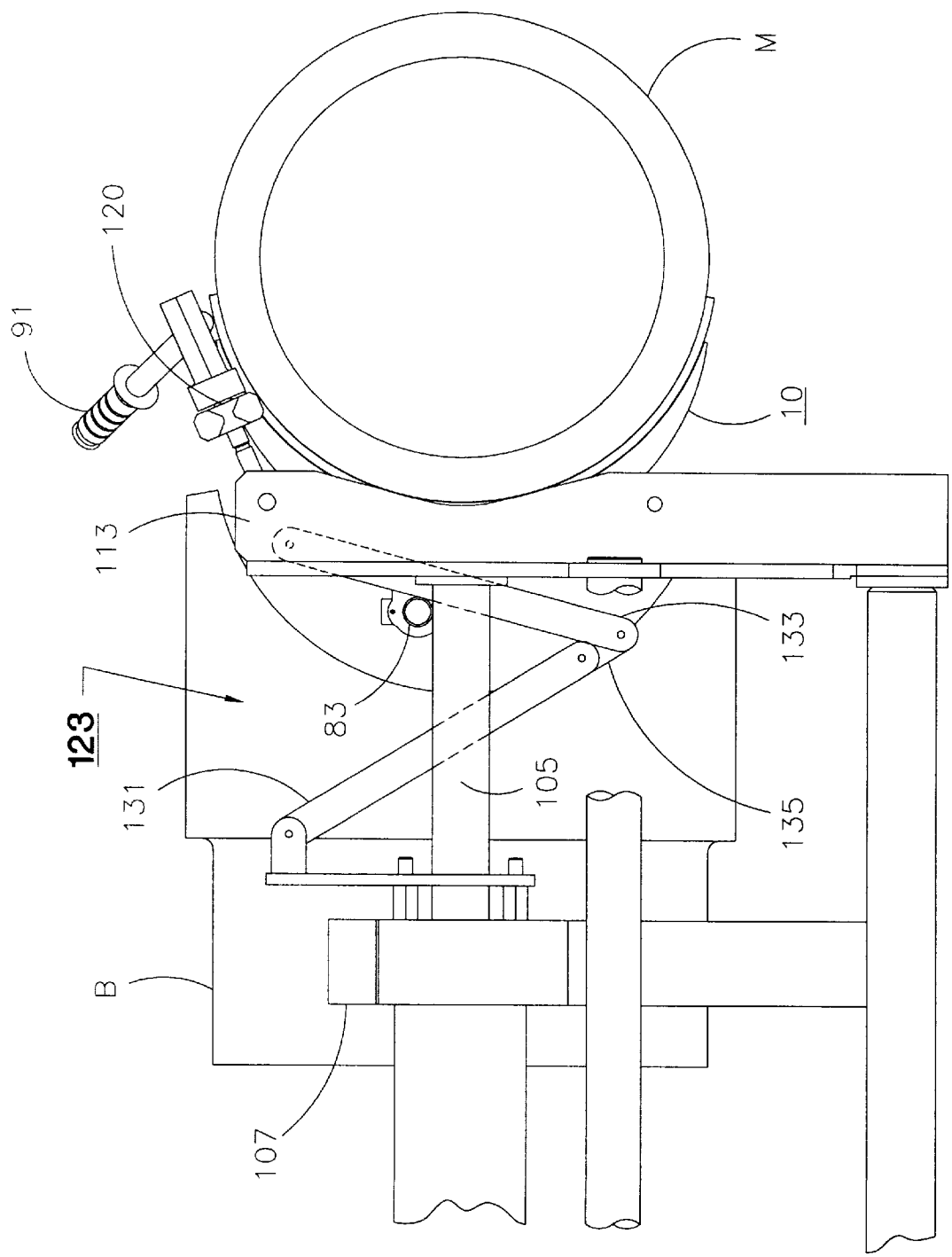
FIG. 9 is a front elevation view with parts broken away of the heater, machine, main pipe and branch pipe of FIG. 7 illustrating the heater "pry-linkage" of FIG. 8 in a "prying" condition.
Figure 10:
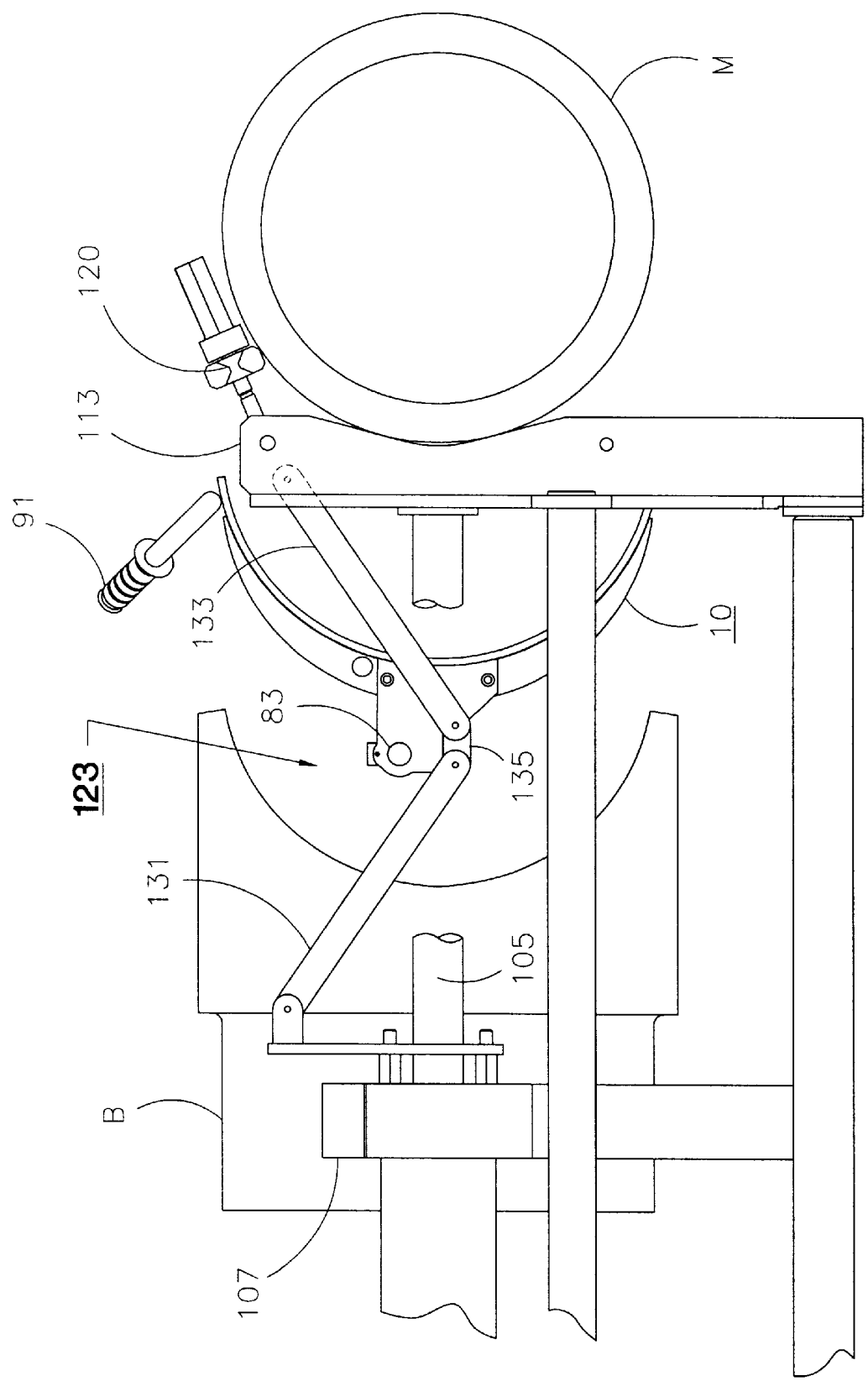
FIG. 10 is a front elevation view with parts broken away of the heater, machine, main pipe and branch pipe of FIG. 7 illustrating the heater "pry-linkage" of FIG. 8 in a "fully open" condition.

The operation of the linkages 121 and 123 can best be understood by reference to FIGS. 8 through 10. The linkage 123 shown in these Figures consists of a branch link 131 which is pivotally connected to the carriage 107 of the machine S and a main link 133 which is connected to one of the machine posts 113. The branch and main links 131 and 133 are connected by a drag link 135 therebetween. Preferably the branch and main links 131 and 133 are of equal length and longer than the drag link 135. As shown in FIG. 8, when the carriage 107 has transferred the branch pipe B to a "fully closed" condition in which the heater 10 is sandwiched between the main and branch pipes M and B, the linkage 123 is disposed in a cup-configuration around the rod or tube portion 83 of the heater lower handle 61. When the surfaces of the branch and main pipes B and M to be joined are molten, the carriage 107 pulls the branch pipe B away from the main pipe M, causing the cup-configuration to widen. As the pipes B and M are separated, one of the pipes B or M will immediately separate from the laminar arrangement of the heater 10. As shown in FIG. 9, the heater 10 has separated from the branch pipe B and the linkage has pivoted into the "prying" condition in which the main link 133 has struck the rod or tube portion 83 of the heater handle 61 and the branch link 131 and the drag link 135 have rotated into alignment with each other. As the carriage 107 continues to pull on the branch link 131, the branch link 131 and drag link 135 urge the main link 133 to pivot against the rod or tube portion 83 and pry the laminar arrangement from the molten surface of the main pipe M. The other linkage 121 is identical to the linkage 123 described and cooperates with its respective machine components to simultaneously cause separation. If the laminar arrangement of the heater 10 had first separated from the molten surface of the main pipe M, then the linkage 123 would operate in similar fashion as described except that the branch link 131 would strike the rod or tube portion 83 of the heater handle 61, the main link 133 and the drag link 135 would align with each other and the carriage movement would cause the branch link 131 to pivot against the rod or tube portion 83 of the heater handle 61 to pry the laminar arrangement from the molten surface of the branch pipe B. The other linkage 121 would function similarly. The "fully open" condition of the linkage is illustrated in FIG. 10, with the molten surfaces of both the main and branch pipes M and B separated from the laminar arrangement of the heater 10 and the carriage 107 and the branch pipe B at a maximum displacement from the main pipe M.

Thus, it is apparent that there has been provided, in accordance with the invention, a heater for use in sidewall fusion of polyolefin pipes that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use in fusing the end of a branch polyolefin pipe to the side wall of a main polyolefin pipe of a specified radius, a heater comprising:

a first rigid plate having a convex outer surface defined by a surface generated by rotating a first straight line about a first parallel line of origin at a radius equal to the specified radius of the main pipe and a concave inner surface;

a second rigid plate having a concave outer surface defined by a surface generated by rotating a second straight line about a second parallel line of origin at a radius equal to the specified radius of the main pipe and a convex inner surface; and a heating element of substantially constant thickness disposed in laminar relationship between said first and second rigid plates, said inner surfaces of said plates being contoured so that, with said heating element in laminar relationship therebetween, said lines of origin of said outer surfaces define a common plane.

2. A heater according to claim 1, said first plate having a constant thickness.

3. A heater according to claim 1, said second plate having a constant thickness.

4. A heater according to claim 1, said plates being welded together with said heating element therebetween.

5. A heater according to claim 1, said plates being screwed together with said heating element therebetween.

6. A heater according to claim 1, said outer surfaces of said plates having serrations thereon, said radius extending from said lines of origin to respective meridians between zeniths and nadirs of said serrations.

7. A heater according to claim 6, said zeniths and nadirs being aligned on cross-sections transverse to said lines of origin.

8. A heater according to claim 7, said zeniths and nadirs of one of said plates being radially aligned with said zeniths and nadirs of the other of said plates, respectively.

9. A heater according to claim 1 having an aperture therethrough defined by a circular cylinder of radius less than an inner radius of the branch pipe, said cylinder being centered on said common plane and extending perpendicular to said lines of origin.

10. A heater according to claim 1 further comprising means for sensing a temperature of said heater and transmitting an electronic signal in response thereto.

11. A heater according to claim 1 further comprising means for connecting said heating element to an electrical power source.

12. For use with a machine for fusing a saddle-cut end of a branch polyolefin pipe to a side wall of a main polyolefin pipe of a specified radius, the machine having means for clamping a main pipe in alignment with a branch pipe and having means for guiding motion of the branch pipe toward and away from the main pipe, a heater assembly comprising:

a first rigid plate having a convex outer surface defined by a surface generated by rotating a first straight line about a first parallel line of origin at a radius equal to the specified radius of the main pipe and a concave inner surface;

a second rigid plate having a concave outer surface defined by a surface generated by rotating a second straight line about a second parallel line of origin at a radius equal to the specified radius of the main pipe and a convex inner surface;

a heating element of substantially constant thickness disposed in laminar arrangement between said first and second plates, said inner surfaces of said plates being contoured so that, with said heating element in said laminar arrangement therebetween, said lines of origin of said outer surfaces define a common plane; and means fixed to said laminar arrangement and cooperable with the branch pipe guiding means for horizontally aligning said laminar arrangement with a saddle-cut end of the branch pipe.

13. A heater according to claim 12, the guide means comprising a pair of horizontal rods diametrically aligned outside of the branch pipe and said aligning means comprising a pair of rods fixed to and extending outwardly from said laminar arrangement along an axis parallel to said lines of origin and above said common plane.

14. For use with a machine for fusing a saddle-cut end of a branch polyolefin pipe to a side wall of a main polyolefin pipe of a specified radius, the machine having a pair of horizontal rods diametrically aligned outside of the branch pipe for guiding a branch pipe gripped by a carriage sliding on the guide rods toward and away from the main pipe and a pair of vertical posts adapted for clamping a main pipe in alignment with the branch pipe, a heater assembly for bringing the surfaces to be joined to a molten state comprising:

a first rigid plate having a convex outer surface defined by a surface generated by rotating a first straight line about a first parallel line of origin at a radius equal to the specified radius of the main pipe and a concave inner surface;

a second rigid plate having a concave outer surface defined by a surface generated by rotating a second straight line about a second parallel line of origin at a radius equal to the specified radius of the main pipe and a convex inner surface;

a heating element of substantially constant thickness disposed in laminar arrangement between said first and second plates, said inner surfaces of said plates being contoured so that, with said heating element in said laminar arrangement therebetween, said lines of origin of said outer surfaces define a common plane; and a pair of heater assembly rods fixed to and extending outwardly from said laminar arrangement along an axis parallel to said lines of origin and above said common plane for horizontally aligning said laminar arrangement with the saddle-cut end of a branch pipe secured in the machine.

15. An assembly according to claim 14 further comprising a linkage pivotally connected at one end to one of the vertical posts of the machine and pivotally connected at another end to the carriage of the machine, said linkage being cooperable with one of said heater assembly rods for disengaging said laminar arrangement from a one of the molten branch and main pipes from which said laminar arrangement does not first disengage as the molten branch pipe is moved away from the molten main pipe.

16. For use with a machine for fusing a saddle-cut end of a branch polyolefin pipe to a side wall of a main polyolefin pipe of a specified radius, the machine having a pair of horizontal rods diametrically aligned outside of the branch pipe for guiding a branch pipe gripped by a carriage sliding on the guide rods toward and away from the main pipe and a pair of vertical posts adapted for clamping a main pipe in alignment with the branch pipe, a heater assembly for bringing the surfaces to be joined to a molten state comprising:

- a first plate having a convex outer surface defined by a surface generated by rotating a first straight line about a first parallel line of origin at a radius equal to the specified radius of the main pipe and a concave inner surface;
- a second plate having a concave outer surface definable as a surface generated by rotating a second straight line about a second parallel line of origin at a radius equal to the specified radius of the main pipe and a convex inner surface;
- a heating element of substantially constant thickness disposed in laminar arrangement between said first and second plates, said inner surfaces of said plates being contoured so that, with said heating element in said laminar arrangement therebetween, said lines of origin of said outer surfaces lie a common plane;
- a pair of heater assembly rods fixed to and extending outwardly from said laminar arrangement along an axis parallel to said lines of origin and above said common plane for horizontally aligning said laminar arrangement with the saddle-cut end of a branch pipe secured in the machine;
- a branch link pivotally connected to the carriage of the machine;
- a main link of length substantially equal to a length of said branch link and pivotally connected to one of the vertical posts of the machine; and
- a drag link shorter than said branch and main links and pivotally connected therebetween, said linkage being disposed in a cup-configuration around said one of said heater assembly rods when said laminar arrangement is abutted between the main and branch pipes, one of said branch and main links striking said one of said heater assembly rods after one of the branch and main pipes, respectively, is disengaged from said laminar arrangement as the molten branch pipe is moved away from the molten main pipe, whereby another of said branch and main links and said drag link rotate into alignment with each other and urge said one of said branch and main links to pivot against said one of said heater assembly rods to pry said laminar arrangement from the other of said molten branch and main pipes.

17. An assembly according to claim 14 further comprising a pair of linkages, a first of said pair of linkages being pivotally connected at one end to one of the vertical posts of the machine and pivotally connected at another end to the carriage of the machine and a second of said pair of linkages being pivotally connected at one end to another of the vertical posts of the machine and pivotally connected at another end to the carriage of the machine, each said linkage being cooperable with one of said heater assembly rods of said laminar arrangement for disengaging said laminar arrangement from a one of the molten branch and main pipes from which said laminar arrangement does not first disengage as the molten branch pipe is moved away from the molten main pipe.

18. For use with a machine for fusing a saddle-cut end of a branch polyolefin pipe to a side wall of a main polyolefin pipe of a specified radius, the machine having a pair of horizontal rods diametrically aligned outside of the branch pipe for guiding a branch pine gripped by a carriage sliding on the guide rods toward and away from the main pipe and a pair of vertical posts adapted for clamping a main pipe in alignment with the branch pipe, a heater assembly for bringing the surfaces to be joined to a molten state comprising:

- a first plate having a convex outer surface defined by a surface generated by rotating a first straight line about a first parallel line of origin at a radius equal to the specified radius of the main pipe and a concave inner surface;
- a second plate having a concave outer surface defined by a surface generated by rotating a second straight line about a second parallel line of origin at a radius equal to the specified radius of the main pipe and a convex inner surface;
- a heating element of substantially constant thickness disposed in laminar arrangement between said first and second plates, said inner surfaces of said plates being contoured so that, with said heating element in said laminar arrangement therebetween, said lines of origin of said outer surfaces lie a common plane;
- a pair of heater assembly rods fixed to and extending outwardly from said laminar arrangement along an axis parallel to said lines of origin and above said common plane for horizontally aligning said laminar arrangement with the saddle-cut end of a branch pipe secured in the machine; and
- a pair of linkages, one connected to each of the vertical posts of the machine,
- said linkages being identical and comprising:
  - a branch link pivotally connected to the carriage of the machine;
  - a main link of length substantially equal to a length of said branch link and pivotally connected to one of the vertical posts of the machine; and
- a drag link shorter than said branch and main links and pivotally connected therebetween, said linkage being disposed in a cup-configuration around one of said heater assembly rods when said laminar arrangement is abutted between the main and branch pipes, one of said branch and main links striking said one of said heater assembly rods after one of the molten branch and main pipes, respectively, is disengaged from said laminar arrangement as the molten branch pipe is moved away from the molten main pipe, whereby another of said branch and main links and said drag link rotate into alignment with each other and urge said one of said branch and main links to pivot against said one of said heater assembly rods to pry said laminar arrangement from the other of said molten branch and main pipes.

19. For use with a machine for fusing a saddle-cut end of a branch polyolefin pipe to a side wall of a main polyolefin pipe of a specified radius, the machine having a pair of horizontal rods diametrically aligned outside of the branch pipe for guiding a branch pipe gripped by a carriage sliding on the guide rods toward and away from the main pipe and a pair of vertical posts adapted for clamping a main pipe in alignment with the branch pipe, a heater assembly for bringing the surfaces to be joined to a molten state comprising:

- a heater having opposed convex and concave surfaces of radius equal to the specified radius of the main pipe; and a pair of heater assembly rods extending outwardly from said heater and sealable on the machine horizontal rods for horizontally aligning said heater with the saddle-cut end of a branch pipe secured in the machine.

20. An assembly according to claim 19 further comprising a linkage pivotally connected at one end to one of the vertical posts of the machine and pivotally connected at another end to the carriage of the machine, said linkage being cooperable with one of said heater assembly rods for disengaging said heater from a one of the molten branch and main pipes from which said heater does not first disengage as the molten branch pipe is moved away from the molten main pipe.

21. For use with a machine for fusing a saddle-cut end of a branch polyolefin pipe to a side wall of a main polyolefin pipe of a specified radius, the machine having a pair of horizontal rods diametrically aligned outside of the branch pipe for guiding a branch pipe gripped by a carriage sliding on the guide rods toward and away from the main pipe and a pair of vertical posts adapted for clamping a main pipe in alignment with the branch pipe, a heater assembly for bringing the surfaces to be joined to a molten state comprising:

a heater having opposed convex and concave surfaces of radius equal to the specified radius of the main pipe; and a pair of heater assembly rods extending outwardly from said heater and seatable on the machine horizontal rods for horizontally aligning said heater with the saddle-cut end of a branch pipe secured in the machine; and a linkage comprising:
a branch link pivotally connected to the carriage of the machine;
a main link of length substantially equal to a length of said branch link and pivotally connected to one of the vertical posts of the machine; and
a drag link shorter than said branch and main links and pivotally connected therebetween, said linkage being disposed in a cup-configuration around said one of said heater assembly rods when said heater is abutted between the main and branch pipes, one of said branch and main links striking said one of said heater assembly rods after one of the molten branch and main pipes, respectively, is disengaged from said heater as the molten branch pipe is moved away from the molten main pipe, whereby another of said branch and main links and said drag link rotate into alignment with each other and urge said one of said branch and main links to pivot against said one of said heater assembly rods to pry said heater from the other of said molten branch and main pipes.

22. An assembly according to claim 19 further comprising a pair of linkages, a first of said pair of linkages being pivotally connected at one end to one of the vertical posts of the machine and pivotally connected at another end to the carriage of the machine and a second of said pair of linkages being pivotally connected at one end to another of the vertical posts of the machine and pivotally connected at another end to the carriage of the machine, each said linkage being cooperable with one of said heater assembly rods for disengaging said heater from a one of the molten branch and main pipes from which said heater does not first disengage as the molten branch pipe is moved away from the molten main pipe.

23. For use with a machine for fusing a saddle-cut end of a branch polyolefin pipe to a side wall of a main polyolefin pipe of a specified radius, the machine having a pair of horizontal rods diametrically aligned outside of the branch pine for guiding a branch pipe gripped by a carriage sliding on the guide rods toward and away from the main pipe and a pair of vertical posts adapted for clamping a main pipe in alignment with the branch pipe, a heater assembly for bringing the surfaces to be joined to a molten state comprising:

a heater having opposed convex and concave surfaces of radius equal to the specified radius of the main pipe; and a pair of heater assembly rods extending outwardly from said heater and seatable on the machine horizontal rods for horizontally aligning said heater with the saddle-cut end of a branch pipe secured in the machine; and a pair of linkages, one connected to each of the vertical posts of the machine, said linkages being identical and comprising:
a branch link pivotally connected to the carriage of the machine;
a main link of length substantially equal to a length of said branch link and pivotally connected to one of the vertical posts of the machine; and
a drag link shorter than said branch and main links and pivotally connected therebetween, said linkage being disposed in a cup-configuration around one of said heater assembly rods when said heater is abutted between the main and branch pipes, one of said branch and main links striking said one of said heater assembly rods after one of the molten branch and main pipes, respectively, is disengaged from said heater as the molten branch pipe is moved away from the molten main pipe, whereby another of said branch and main links and said drag link rotate into alignment with each other and urge said one of said branch and main links to pivot against said one of said heater assembly rods to pry said heater from the other of said molten branch and main pipes.

* * * * *